United States Patent
Zhang et al.

(10) Patent No.: US 6,645,439 B2
(45) Date of Patent: *Nov. 11, 2003

(54) EXHAUST GAS CLEAN-UP CATALYST

(75) Inventors: Geng Zhang, Utsunomiya (JP); Tomotaka Hirota, Takanezawa-machi (JP); Yasunori Kurashima, Ujiie-machi (JP); Hideaki Muraki, Utsunomiya (JP)

(73) Assignee: Johnson Matthey Japan Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,820

(22) Filed: May 25, 1999

(65) Prior Publication Data
US 2003/0129099 A1 Jul. 10, 2003

(30) Foreign Application Priority Data
May 27, 1998 (JP) .............................. 10-146276

(51) Int. Cl.$^7$ ............................. B01D 53/94; B01J 23/64
(52) U.S. Cl. ...................... 422/177; 422/170; 422/180; 502/527.12; 502/527.13; 502/313
(58) Field of Search ................................ 422/177, 180, 422/170; 502/439, 527.12, 527.13, 304, 204, 313, 305

(56) References Cited

U.S. PATENT DOCUMENTS

| | | | |
|---|---|---|---|
| 4,061,713 A | 12/1977 | Weidenbach et al. | 423/213.5 |
| 4,500,650 A | 2/1985 | Wyatt et al. | 502/204 |
| 4,508,691 A | 4/1985 | Adams et al. | 423/213.5 |
| 5,208,204 A | 5/1993 | Subramanian et al. | 502/303 |
| 5,866,498 A | 2/1999 | Chattha et al. | 502/303 |

FOREIGN PATENT DOCUMENTS

| | | |
|---|---|---|
| EP | 0 070 736 | 1/1983 |
| EP | 0 661 089 | 7/1995 |
| EP | 0 763 380 | 3/1997 |
| JP | 60-54730 | 3/1985 |
| JP | 61-11147 | 1/1986 |
| JP | 05-277369 | * 10/1993 |
| JP | 6-190276 A | 7/1994 |
| JP | 6-198178 A | 7/1994 |
| JP | 6-262079 A | 9/1994 |
| JP | 7-204510 A | 8/1995 |
| WO | WO 99/56872 | 11/1999 |

OTHER PUBLICATIONS

Guenther et al., "Comparison of Vehicle Running Loss Evaporative Emissions Using Point Source and Enclosure Measurement Techniques," Copyright ©1998 Society of Automotive Engineers, Inc., 980403, pp. 131–143.

Akashi et al., "Utilization of a Soft Ionization Mass Spectrometer for Ultra High Sensitivity and Fast Response Emission Measurements," Copyright ©1998 Society of Automotive Engineers, Inc., 980046, pp. 50–60.

Cornelius et al., "The role of oxygen storage in NO conversion in automotive catalysts," *Topics in Catalysts*, vol. 16/17, Nos. 1–4, 2001, pp. 57–62.

European Search Report for corresponding EPO Application No. EP 99 30 4131, dated Jan. 31, 2000, Search Completed Jan. 24, 2000.

* cited by examiner

Primary Examiner—Hien Tran
(74) Attorney, Agent, or Firm—RatnerPrestia

(57) ABSTRACT

Exhaust gas clean-up catalysts that contain one or two or more noble metals chosen from the group platinum (Pt), rhodium (Rh), ruthenium (Ru), Iridium (Ir), osmium (Os) and other noble metals, and at least one of tungsten (W) metal or tungsten oxide and, optionally, at least one of niobium (Nb) metal, niobium oxide, molybdenum (Mo) metal, or molybdenum oxide, and which can also contain the metal oxide(s) ceria and/or zirconia if necessary, are especially useful for cleaning up hydrocarbons in exhaust gases.

9 Claims, No Drawings

EXHAUST GAS CLEAN-UP CATALYST

This invention relates to exhaust gas clean-up catalysts for cleaning the exhaust gas discharged from fuel combustion engines, for example internal combustion engines and external combustion engines, and to methods of exhaust gas clean-up using the catalysts Three-way catalysts capable of simultaneously reducing the levels of hydrocarbon (HC), nitrogen oxides ($NO_x$) and carbon monoxide (CO) have been under develop for practical application as catalysts for exhaust gas clean-up since the 1970s. Such catalyst are described for example in Japan Patent Kokai No. 60-54730 and Japan Patent Kokai No. 61-11147. A three-way catalyst converts the reducing components (HC, CO, $H_2$) and oxidising components ($NO_x$, $O_2$) in exhaust gas to harmless components ($H_2O$, $CO_2$, $N_2$) by redox relation at a near theoretical fuel-air ration ($\lambda \sim 1$).

At the relatively low temperatures prevailing timely after start-up of a fuel combustion engine, however, even a three-way catalyst has low activity, making it difficult to clean up the noxious components from the exhaust gas. As a method of quickly raising the activity of three-way catalysts, therefore, in-line catalyst, systems combining in-line catalysts and underfloor catalysts, electrically heated catalysts, burner heated catalysts and adsorbents have heretofore been used, but for reasons including catalyst location, increase in cost, reduction in fuel consumption, and durability, the problem still remains to be solved Catalysts with low temperature activity have been under development that have high catalytic capability enabling effective clean-up of exhaust gas in the low temperature region directly after start-up of fuel combustion engines without recourse to the aforementioned indirect devices or techniques of raising the active capability of the catalyst. For example, catalysts whereby the nitrogen oxides ($NO_x$) in exhaust gas can be cleaned up at low temperature are disclosed in the specifications of Japan Patent Kokai No. 6-190276, Japan Patent Kokai Nol. 6-198178 and Japan Patent Kokai No. 6-262079. Similarly, catalysts capable of cleaning up hydrocarbons (HC) and carbon monoxide (CO) at low temperature are disclosed in Japan Patent Kokai No. 7-204510.

Although these prior art catalysts have been improved or modified to meet the aim of cleaning up exhaust gas, room for improvement exists in that they have low oxidising activity is respect of saturated hydrocarbons; in particular, they have not afforded sufficient clean-up capability at low temperature prevailing directly after start-up of fuel combustion engines The inventors have found that catalysts containing specified elements and compounds were adequately capable of cleaning up exhaust gas at the low temperatures prevailing directly after start-up of fuel combustion engines. In particular, the inventors discovered catalysts with low temperatures activity that afforded outstanding clam-up of the hydrocarbons, especially the saturated hydrocarbons, in the exhaust gas evolved in the low temperature region directly after start-up of fuel combustion engines.

The aim of the invention is accordingly to provide catalysts with low temperature activity whereby the exhaust gas evolved in the low temperature region directly after start-up of fuel combustion engines can be satisfactorily cleaned up.

The exhaust gas clean-up catalysts used in the invention to clean the exhaust gas from fuel combustion engines are catalysts containing one or two or more noble metals chosen from the group platinum (Pt), palladium (Pd), rhodium (Rh), iridium (Ir), osmium (Os) and other noble metals and one or two or more metals or metal oxides chosen from the group tungsten (W), niobium (Nb) and molybdenum (Mo) oxides.

The exhaust gas clean-up catalysts in the invention can also contain the metal oxide(s) ceria and/or zirconia The invention further comprises exhaust gas clean-up catalyst wherein the aforesaid catalysts are supported on one or two or more metal oxides chosen from the group alumina silica, titania and zirconia The catalyst compositions in the invention use at least one of tungsten (W) metal or tungsten oxide.

In the preferred embodiment of the invention, the catalysts also contain at least one of niobium (Nb) metal, niobium oxide, molybdenum (Mo) metal or molybdenum oxide.

On inclusion of these oxides in alumina or zirconia, catalyst acid increases, promoting dissociative adsorption of hydrocarbons, and it may be supposed that the oxides contribute to the oxidation of hydrocarbons as a result thereof. Development of acidity is especially prominent with tungsten oxide because it complexes with alumina and zirconia, and tungsten oxide is therefore especially preferred.

In the preferred embodiment of the invention, the content of tungsten (W), niobium (Nb) and molybdenum (Mo) in the catalyst is in the approximate range 0.5–20 wt %, preferably 1.5–15 wt %, as the amount of metal with respect to the whole catalyst. With a loading in the approximate range 0.5–20 wt %, catalyst efficacy can be fully displayed and the problem of saturation of the additive effect does not arise.

The metal oxide(s) ceria and/or zirconia can be used in the catalyst compositions of the invention.

Ceria has oxygen storage capability and can stabilise catalyst performance when deviations in fuel/air ratio occur close to the theoretical fuel/air ratio. Ceria can also confer durability on the noble metals comprising the catalytic composition Zirconia can increase the heat-resistance of tungsten (W), niobium (Nb) and molybdenum (Mo) as well as that of ceria. Moreover, acidity can be father raised by complexing with tungsten, etc., and we expect this strong acidity to afford improvement in the heat resistance of noble metals.

In the preferred embodiment of the invention, exhaust gas clean-up catalysts wherein the metal oxide(s) ceria and/or zirconia and the one or two or more metal oxides chosen from the group tungsten (w), niobium (Nb) and molybdenum (Mo) oxides consume a compound oxide are preferred.

Catalysts of preferred heat resistance can be formulated by constituting a compound oxide. Although the actual structure and action of the aforesaid compound oxide are not fully understood, the inventors suppose that in a compound oxide of tungsten oxide and zirconia, for example, the crystallites of tungsten oxide are mutually isolated by zirconia crystallites, hindering sintering and thereby improving heat-resistance.

In a preferred embodiment of the invention, a compound oxide of ceria, a compound oxide of a ceria-zirconium and preferably a compound oxide of zirconia, with the oxide(s) of tungsten (W), niobium (Nb) and molybdenum (Mo) is used in the catalyst composition.

Compound oxides wherein zirconia has been added to oxides of tungsten (W), niobium (Nb) and molybdenum (Mo) have excellent capacity for cleaning saturated hydrocarbons from exhaust gas by oxidation, especially under relatively low temperature conditions. In particular, significant low temperature activity is displayed under conditions where the carbon monoxide concentration in the exhaust gas is 0.5% or less.

The noble metals have long been used as metals constituting three-way catalysts. In the catalyst compositions of the invention a single metal or a mixture of two or more of the metals can be used. In the preferred embodiment of the invention, the use of platinum (Pt) is preferred. For a noble metal, platinum (Pt) has outstanding saturated hydrocarbon clean-up capability under low temperature conditions.

One or two or more metal oxides chosen from the group alumina, silica, titania and zirconium and their mixtures can be used as the support in the catalyst compositions of the invention. The compositions so constituted are used both to stabilise the active components of the catalyst and to raise clean-up performance by increasing the area of contact with the exhaust gas. In the preferred embodiment of the invention, it is preferred to use alumina as the support.

Although the exhaust gas clean-up catalysts of the invention require the use of the aforesaid catalyst compositions, the catalysts may contain other optional components within the limits of adherence to the spirit of the invention.

According to the preferred embodiment of the invention, the exhaust gas clean-up catalyst can be produced using conventional catalyst manufacturing technology, suitably by adding optional components as necessary to the catalyst components (wash coat) containing tungsten oxide and ceria and/or zirconia, and then supporting platinum thereon.

Any method may be used to add tungsten oxide. Moreover, the order of addition is optional; for example, the addition maybe made at the same time as, before, or after the addition of platinum, the addition may be made along with the alumina and/or zirconia, or the addition may be made after complexing tungsten oxide with zirconia.

According to the preferred embodiment of the invention, the exhaust gas clean-up catalyst can be produced by forming the catalyst composition as an oxide solely by calcination in air, without recourse to reductive treatment at any stage of catalyst preparation. The salts or compounds of tungsten and zirconium used in catalyst production are thermally decomposed by calcination in air, facilitating uniform mixing with other catalyst components in the course of combination with oxygen in the air. Moreover, the production flowchart can be greatly simplified since calcination in special atmospheres other than air, for reductive treatment or the like, is unnecessary.

According to the preferred embodiment of the invention, a method of exhaust gas clean-up and exhaust gas clean-up apparatus are preferred wherein the exhaust gas is treated in the channel through which the which the exhaust gas from the fuel combustion engine discharges, first with an exhaust gas clean-up catalyst excellent for oxidation of carbon monoxide and unsaturated hydrocarbons, disposed within the exhaust gas channel, and then with the exhaust gas clean-up catalysts claimed for the invention, disposed at the same location as or rearward of the location of the said catalyst.

By pretreating the carbon monoxide and unsaturated hydrocarbons present in the exhaust gas with an exhaust gas clean-up catalyst excellent for oxidation, it is possible to prevent the negative effects of a high concentration of carbon monoxide, for example poisoning of platinum metals; the saturated hydrocarbons can then be effectively cleaned up in the low temperature region by means of an exhaust gas clean-up catalyst of the invention located rearward.

A catalyst containing one or more metals chosen from the group comprising palladium, rhodium, together with ceria may be cited as an example of the exhaust gas clean-up catalyst excellent for oxidation of carbon monoxide and unsaturated hydrocarbons that is used in the invention.

According to the preferred embodiment of the invention, it is preferred to use an exhaust gas clean-up catalyst wherein, to prevent the negative effects of carbon monoxide, the exhaust gas clean-up catalyst of the invention is supported in a lower layer or upper layer, and an exhaust gas clean-up catalyst with a high capability for removal of carbon monoxide and hydrocarbons is supported in the upper layer or lower layer on the same support (for example a honeycomb support), or a mixture thereof.

The catalyst is then able to remove carbon monoxide from exhaust gas with high efficiency, while the saturated hydrocarbons in the exhaust gas can be removed efficiently and effectively with the gas clean-up catalyst of the invention disposed at the same location or located rearward.

The exhaust gas clean-up apparatus of the invention comprises apparatus for cleaning up the exhaust gas from fuel combustion engines wherein the exhaust gas clean-up catalyst of the invention and, if necessary, an exhaust gas clean-up catalyst that removes carbon monoxide and unsaturated hydrocarbons by oxidation are disposed in the path of the exhaust gas outflow. As a practical embodiment of the invention, the exhaust gas clean-up catalyst of the invention can be used as an in-line catalyst, in-line/underfloor catalyst, electrically heated catalyst or burner catalyst for reducing the hydrocarbon level of the exhaust gas at low temperature. It is also possible to use a combination of hydrocarbon adsorbents, etc., and the aforesaid forms of catalyst.

"Fuel combustion engine" here means an engine that generates energy by burning fuel, irrespective of whether described as an internal combustion engine, an external combustion engine or by another term "Exhaust gas" means the gas formed by the fuel combustion engine after fuel combustion and includes incompletely burned or unburned fuel gas. "Saturated hydrocarbons" denotes hydrocarbons that do not have double bonds between carbon atoms. The term includes, for example, ethane, propane and isobutane.

The working examples shown below describe the invention in further detail. Accordingly, the said examples are no more than simple illustrations presented to facilitate understanding of the invention and do not limit the scope of the invention.

EXAMPLE 1

Cerium oxide powder was added to commercial alumina powder (BET specific surface area 200 $m^2/g$) and mixed therewith so that cerium oxide constituted 50 wt % of the total mixture. A slurry was made by adding water and acetic acid to the mixed powder and milling the mixture in a ball mill for 1 hour. A core of diameter 1 inch, length 3 cm, drilled from a commercial 400 cpsi cordierite honeycomb was dipped in the slurry. On withdrawal of the core, the excess slurry was removed with an air gun and the core was dried for 30 min at 105° C. and then calcined for 1 hour at 500° C. The amount of slurry deposited was 110 g per litre of cordierite honeycomb after calcination.

An ammonium tungstate solution was prepared such that, based on the water absorption of the cordierite honeycomb, tungsten 4.5 wt % as metal component could be loaded with respect to the amount of slurry exclusive of the said core. The core on which the slurry had been deposited was dipped in the solution and on withdrawal of the core the excess solution was removed with an air gun and the core was dried for 30 min at 105° C. and then calcined for 1 hour at 500° C.

A solution of [Pt(NH$_3$)$_4$]Cl$_2$ was then prepared such that, based on the water absorption of the cordierite honeycomb, 5.3 g of platinum (Pt) could be loaded per litre of cer-cordierite honeycomb. The said core supporting tungsten was dipped in the solution and on withdrawal of the core the excess solution was removed with an air gun, and the core was dried for 30 min at 105° C. and then calcined for 1 hour at 500° C.

A catalyst 1 containing tungsten was thereby obtained.

EXAMPLE 2

A catalyst was prepared by the same procedure as in Example 1 except that, in the step wherein tungsten was supported on the core whereon slurry had been deposited in Example 1, ammonium tungstate was replaced with niobium oxalate and the niobium loading was 2.3 wt %.

A catalyst 2 containing niobium was thereby obtained.

EXAMPLE 3

A catalyst was prepared by the same procedure as in Example 1 except that, in the step wherein tungsten was supported on the core whereon slurry had been deposited in Example 1, ammonium tungstate was replaced with ammonium molybdate and the molybdenum loading was 2.3 wt %.

A catalyst 3 containing molybdenum was thereby obtained.

EXAMPLE 4

A catalyst was prepared by the same procedure as in Example 1 except that, in the step wherein tungsten was supported on the core whereon slurry had been deposited in Example 1, the tungsten loading was 1.5 wt %.

A catalyst 4 containing tungsten was thereby obtained.

EXAMPLE 5

A catalyst was prepared by the same procedure as in Example 1 except that, in the step wherein tungsten was supported on the core whereon slurry had been deposited in Example 1, the tungsten loading was 3.0 wt %.

A catalyst 5 containing tungsten was thereby obtained.

EXAMPLE 6

A catalyst was prepared by the same procedure as in Example 1 except that, in the step wherein tungsten was supported on the core whereon slurry had been deposited in Example 1, the tungsten loading 10 wt %.

A catalyst 6 containing tungsten was thereby obtained.

EXAMPLE 7

A catalyst was prepared by the same procedure as in Example 1 except in the step wherein tungsten was supported on the core whereon slurry had been deposited in Example 1, the tungsten loading was 15 wt %.

A catalyst 7 containing tungsten was thereby obtained.

EXAMPLE 8

Cerium oxide powder and commercial alumina powder (BET Specific surface area 200 m$^2$/g) were mixed with a tungsten-zirconia compound oxide (W—ZrO$_2$) containing tungsten 4 mol % to give a weight ratio of the respective powders of 3:2:2. A slurry was made by adding water and acetic acid to the mixed powder and milling the mixture in a ball mill for 1 hour. A core of diameter 1 inch, length 3 cm, drilled from a commercial 400 cpsi cordierite honeycomb was dipped in the slurry. On withdrawal of the core, the excess slurry was removed with an air gun and the core was dried for 30 min at 105° C. and then calcined for 1 hour at 500° C. The amount of slurry deposited was 210 g per liter of cordierite honeycomb after calcination.

A solution of [Pt(NH$_3$)$_4$]Cl$_2$ was then prepared such that, based on the water absorption of the cordierite honeycomb, 5.3 g of platinum (Pt) could be loaded per litre of cordierite honeycomb. The core whereon slurry had been deposited was dipped in the solution and on withdrawal of the core the excess solution was removed with an air gun and the core was dried for 30 min at 105° C. and the calcined for 1 hour at 500° C.

A catalyst 8 containing tungsten-zirconia compound oxide was thereby obtained.

The tungsten-zirconia compound oxide was produced as follows. Sufficient ammonium tungstate solution was added to commercial zirconium hydroxide containing 80% water to give a tungsten content of 4 mol % and the mixture was heated with stirring to evaporate the water. The material was then dried for 30 min at 105° C. and calcined in an electric furnace for 2 hours at 500° C. to obtain tungsten-zirconium compound oxide.

EXAMPLE 9

A catalyst was prepared by the same procedure as in example 8 except that the cerium oxide powder in Example 8 was omitted. Catalyst 9 was thereby obtained. The amount of slurry deposited before loading with platinum in the catalyst preparation sequence was 150 g per liter of cordierite honeycomb after calcination.

EXAMPLE 10

A palladium nitrate solution was prepared to give an ultimate content of palladium of 10 wt % deposited on commercial alumina (BET specific surface area 200 m$^2$/g). The alumina was loaded with palladium by mixing with the palladium nitrate solution. The material was then dried for 30 min at 105° C. and then calcined in an electric furnace for 2 hours at 500° C. A slurry was prepared by adding water and acetic acid to the alumina containing palladium and milling the mixture for 1 hour in a ball mill.

The slurry was coated as a second layer on the surface of the Catalyst 1 obtained in Example 1. The catalyst thus coated was dried for 30 min at 105° C. and then calcined for 1 hour at 500° C. The amount of slurry in the second layer was 35 g per liter of cordierite honeycomb. A catalyst 10 with a double layer structure comprising a platinum catalyst containing tungsten in the first layer and a catalyst containing palladium in the second layer was thereby obtained.

COMPARATIVE EXAMPLE A

A catalyst was prepared by the same procedure as in Example 1 except that loading with tungsten was omitted. A comparative catalyst A was thereby obtained.

COMPARATIVE EXAMPLE B

A catalyst was prepared by the same procedure as in Example 10 except that loading with tungsten was omitted. A comparative catalyst B was thereby obtained.

COMPARATIVE EXAMPLE C

A catalyst was prepared by the same procedure as in Example 9 except that the tungsten-zirconia compound oxide in example 9 was replaced with the corresponding amount of alumina. A comparative catalyst C containing only alumina and platinum was thereby obtained.

METHODS OF EVALUATION

High Temperature Treatment

Using an electric oven wherein the outside of a silica tube through which gas could be passed had been surrounded with an electrical heater, the catalyst core was mounted in the tube and raised to the specified treatment in a nitrogen atmosphere. Gas mixtures respectively providing a reducing atmosphere (hydrogen 6 vol %+water vapour 10 vol %+nitrogen 84 vol %) and an oxdising atmosphere (oxygen 3 vol %+water vapour 10%+nitrogen 87 vol %) were passed for 10 min each at that temperature to complete 1 cycle and the cycle was repeated for 20 hours. The total flow rate was 3 liter/min and the treatment temperatures were set at 700° C. or 900° C.

Activity Test Method

The core of prepared catalyst was mounted in a conventional flow rector so that gas could not by-pass the core. The reactant gas composition 3 shown in Table 1 hereunder was first maintained for 15 min at 500° C. and the temperature was then lowered to not more than 90° C. in a nitrogen atmosphere. Thereafter, the specified gas compositions shown in Table 1 hereunder were admitted to the flow reactor, the temperature of the electric oven was raised at a rate of 25° C. per min and the gas composition at the catalyst exit was determined; in addition, the clean-up rate was calculated in accordance with the following formula for each of the components as required.

Clean-up (%)=100×(inlet propane concentration-exit propane concentration)/inlet propane concentration.

TABLE 1

Reactant Gas Composition

| Gas | Composition 1 | Composition 2 | Composition 3 | Composition 4 |
|---|---|---|---|---|
| CO (%) | 0.0 | 0.2 | 0.5 | 0.0 |
| $O_2$ (%) | 0.5 | 0.5 | 0.5 | 0.5 |
| $H_2$ (%) | 0.17 | 0.17 | 0.17 | 0.67 |
| NO (ppm) | 500 | 500 | 500 | 500 |
| $C_3H_8$ (ppm C) | 1200 | 1200 | 1200 | 1200 |
| $CO_2$ (%) | 14 | 14 | 14 | 14 |
| $H_2O$ (%) | 10 | 10 | 10 | 10 |
| $N_2$ (%) | balance | balance | balance | balance |

The following Table 2 shows the results of activity tests carried out to compare the performance of the catalysts produced in the Examples of the Invention and Comparative Examples before high temperatures treatment. It will be seen from Table 2 that the Catalysts 1–7 of the invention have a high propane clean-up capability compared with the Comparative catalyst A.

To evaluate the propane ignition characteristic of the catalyst (the temperature at which the catalyst starts to function), the temperature which the propane clean-up rate reaches 50% was recorded as $T_{50}$. The value thereof was used to evaluate catalyst performance.

TABLE 2

Results of Reaction before High Temperature Treatment

| | W (wt %) | Nb (%) | Mo (%) | Gas composition | $T_{50}$ (° C.) |
|---|---|---|---|---|---|
| Catalyst 1 | 4.5 | 0 | 0 | Composition 1 | 309 |
| Catalyst 2 | 0 | 2.3 | 0 | Composition 1 | 350 |
| Catalyst 3 | 0 | 0 | 2.3 | Composition 1 | 310 |
| Catalyst 4 | 1.5 | 0 | 0 | Composition 1 | 339 |
| Catalyst 5 | 3.0 | 0 | 0 | Composition 1 | 319 |
| Catalyst 6 | 10 | 0 | 0 | Composition 1 | 330 |
| Catalyst 7 | 15 | 0 | 0 | Composition 1 | 340 |
| Comparative catalyst A | 0 | 0 | 0 | Composition 1 | 362 |

The following Table 3 shows the results of activity tests carried out to compare the performance of the catalyst produced in the Examples and Comparative Examples after high temperature treatment at 700° C. It will be seen from Table 3 that the Catalysts 1–3 containing W, Nb or Mo as claimed for the invention retain high propane clean-up capability compared with Comparative catalyst A after high temperature treatment.

TABLE 3

Results of Tests after High Temperature Treatment at 700° C.

| | W (wt %) | Nb (%) | Mo (%) | Gas Composition | $T_{50}$ (° C.) |
|---|---|---|---|---|---|
| Catalyst 1 | 4.5 | 0 | 0 | Composition 1 | 292 |
| Catalyst 2 | 0 | 2.3 | 0 | Composition 1 | 310 |
| Catalyst 3 | 0 | 0 | 2.3 | Composition 1 | 307 |
| Comparative catalyst A | 0 | 0 | 0 | Composition 1 | 319 |

The following Table 4 shows the results of activity test carried out to compare the performance of the catalyst as produced in the examples and Comparative Examples after high temperatures treatment at 900° C. It will be seen from Table 4 that the Catalyst 1 and 4–9 of the invention retain high propane clean-up capability compared with Comparative catalyst A after high temperature.

TABLE 4

Results of Tests after High Temperature Treatment 900°0 C.

| | W (wt %) | W-$ZrO_2$ | $CeO_2$ | Gas composition | $T_{50}$ (° C.) |
|---|---|---|---|---|---|
| Catalyst 4 | 1.5 | — | — | Composition 1 | 317 |
| Catalyst 5 | 3.0 | — | — | Composition 1 | 311 |
| Catalyst 1 | 4.5 | — | — | Composition 1 | 313 |
| Catalyst 6 | 10 | — | — | Composition 1 | 320 |
| Catalyst 7 | 15 | — | — | Composition 1 | 335 |
| Catalyst 8 | — | present | present | Composition 1 | 310 |
| Catalyst 9 | — | present | absent | Composition 1 | 313 |
| Compartive example A | 0 | absent | present | Composition 1 | 340 |

The following Table 5 shows the result of activity tests carried out to compare the effect of carbon monoxide concentration on the catalyst produced in the Examples and Comparative Examples after high temperature treatment at 900° C. It will be seen from Table 5 that, compared with the Comparative catalyst A to C, the Catalyst 9 of the invention increases its propane clean-up capability with decrease in carbon monoxide concentration even after high temperature (900° C.).

| | Gas composition | $H_2$ concentration (%) | CO concentration (%) | $T_{50}$ (° C.) |
|---|---|---|---|---|
| Catalyst 9 | Composition 2 | 0.17 | 0.2 | 289 |
| Catalyst 9 | Composition 3 | 0.17 | 0.5 | 303 |
| Catalyst 9 | Composition 4 | 0.67 | 0.0 | 233 |
| Comparative catalyst A | Composition 2 | 0.17 | 0.2 | 305 |
| Comparative catalyst A | Composition 3 | 0.17 | 0.5 | 288 |
| Comparative catalyst A | Composition 4 | 0.67 | 0.0 | 260 |
| Comparative catalyst C | Composition 2 | 0.17 | 0.2 | 319 |
| Comparative catalyst C | Composition 3 | 0.17 | 0.5 | 331 |
| Comparative catalyst C | Composition 4 | 0.67 | 0.0 | 273 |

The following Table 6 shows the results of activity tests carried out after high temperature treatment at 900° C. to compare the performance of the catalysts with a double layer structure produced in Example 10 and the Comparative example B. It will be seen from Table 6 that the propane clean up capability of the Catalyst 10 of the invention in the low temperature region compared with the Comparative catalyst B, even after high temperature treatment (900° C.).

TABLE 6

Test Results after High Temperature Treatment at 900° C.

| | Gas composition | w | $T_{50}$ (° C.) |
|---|---|---|---|
| Catayst 10 | Composition 3 | present | 316 |
| Comparative catalyst B | Composition 3 | absent | 345 |

It will be clear from the foregoing examples that, compared with the comparative catalyst, the exhaust gas clean-up catalysts claimed for the invention containing oxides of tungsten, niobium and molybdenum as additives are capable of cleaning up saturated hydrocarbons from exhaust gas by oxidation as the carbon monoxide concentration decreases, notwithstanding low temperatures. Moreover, the exhaust gas clean-up catalysts of the invention have outstanding heat-resistance and are able to remove saturated hydrocarbons efficiently irrespective of whether or not they contain the ceria component heretofore used. Furthermore, the benefit of the additive can be elicited by locating a palladium catalyst capable of removing carbon monoxide in the upper layer of the catalyst.

What is claimed is:

1. An exhaust gas clean-up catalyst structure comprising a two-layer composite having:
   (a) a first exhaust gas clean-up catalyst in one layer of said two-layer composite, said first exhaust gas clean-up catalyst comprising a first particulate support material consisting essentially of ceria and zirconia, at least one noble metal selected from the group consisting of platinum (Pt), palladium (Pd), rhodium (Rh), ruthenium (Ru), and osmium (Os), and tungsten oxide supported by said first particulate support material and complexed with the zirconia; and
   (b) a second exhaust gas clean-up catalyst in the other layer of said two-layer composite for oxidizing carbon monoxide and unsaturated hydrocarbons, wherein said second catalyst comprises a second particulate support material.

2. The exhaust gas clean-up catalyst structure according to claim 1, wherein said second particulate support material comprises at least one metal oxide selected from the group consisting of alumina, silica, titania and zirconia.

3. The exhaust gas clean-up catalyst structure according to claim 1, wherein the content of the tungsten oxide is 0.5–20 wt % with respect to the first exhaust gas clean-up catalyst.

4. The exhaust gas clean-up catalyst structure according to claim 1, wherein said first gas clean-up catalyst further comprises at least one of niobium (Nb) metal, niobium oxide, molybdenum (Mo) metal, or molybdenum oxide.

5. The exhaust gas clean-up catalyst structure according to claim 4, wherein the content of the tungsten oxide and the at least one of niobium (Nb) metal, niobium oxide, molybdenum (Mo) metal, or molybdenum oxide is 0.5–20 wt % with respect to the first exhaust gas clean-up catalyst.

6. The exhaust gas clean-up catalyst structure according to claim 5, wherein the content of the tungsten oxide and the at least one of niobium (Nb) metal, niobium oxide, molybdenum (Mo) metal, or molybdenum oxide is 1.5–15 wt % with respect to the first exhaust gas clean-up catalyst.

7. An exhaust gas clean-up catalyst structure comprising:
   a first particulate support material consisting essentially of ceria and zirconia;
   a first exhaust gas clean-up catalyst for oxidizing saturated hydrocarbons comprising said first particulate support material at least one noble metal selected from the group consisting of platinum (Pt), palladium (Pd), rhodium (Rh), ruthenium (Ru), osmium (Os) and other noble metals, and tungsten oxide supported by said first particulate support material and complexed with the zirconia;
   a second exhaust gas clean-up catalyst for oxidizing carbon monoxide and unsaturated hydrocarbons comprising a second particulate support material;
   a substrate on which the first exhaust gas clean-up catalyst and the second exhaust gas clean-up catalyst are disposed; and
   wherein the catalyst structure is configured such that the exhaust gas is exposed to said second exhaust gas clean-up catalyst before the exhaust gas is exposed to said first exhaust gas clean-up catalyst.

8. The exhaust-gas clean-up catalyst structure according to claim 7, wherein:
   said first exhaust gas clean-up catalyst is disposed in a first layer;
   said second exhaust gas clean-up catalyst is disposed in a second layer; and
   said first layer is formed between said second layer and said substrate.

9. The exhaust gas clean-up catalyst structure according to claim 7, wherein said first exhaust gas clean-up catalyst and said second exhaust gas clean-up catalyst are each disposed in separate zones on said substrate.

* * * * *